US008496057B2

(12) United States Patent
Ferrero et al.

(10) Patent No.: US 8,496,057 B2
(45) Date of Patent: Jul. 30, 2013

(54) PROPPANT, A METHOD FOR PRODUCTION THEREOF AND FORMATION HYDRAULIC FRACTURING METHOD USING THE PRODUCED PROPPANT

(75) Inventors: Jose Rafael Silva Ferrero, Mexico City (MX); Elena Mikhaylovna Pershikova, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 282 days.

(21) Appl. No.: 12/678,422

(22) PCT Filed: Sep. 18, 2007

(86) PCT No.: PCT/RU2007/000502
§ 371 (c)(1), (2), (4) Date: May 21, 2010

(87) PCT Pub. No.: WO2009/038491
PCT Pub. Date: Mar. 26, 2009

(65) Prior Publication Data
US 2010/0252263 A1   Oct. 7, 2010

(51) Int. Cl.
*C09K 8/80* (2006.01)
*E21B 43/267* (2006.01)

(52) U.S. Cl.
USPC ............... 166/280.2; 166/308.3; 428/402; 507/269; 507/906; 507/924

(58) Field of Classification Search
None
See application file for complete search history.

(56) References Cited

U.S. PATENT DOCUMENTS

| | | | |
|---|---|---|---|
| 3,245,866 A * | 4/1966 | Schott ........................... | 428/402 |
| 3,929,191 A | 12/1975 | Graham et al. | |
| 4,668,645 A | 5/1987 | Khaund | |
| 4,713,203 A | 12/1987 | Andrews | |
| 4,879,181 A | 11/1989 | Fitzgibbon | |
| 4,921,820 A | 5/1990 | Rumpf et al. | |
| 4,944,905 A | 7/1990 | Gibb et al. | |
| 5,188,175 A | 2/1993 | Sweet | |
| 6,753,299 B2 | 6/2004 | Lunghofer | |
| 7,036,591 B2 * | 5/2006 | Cannan et al. ............. | 166/280.2 |
| 7,160,844 B2 * | 1/2007 | Urbanek ........................ | 507/269 |
| 2006/0016598 A1 * | 1/2006 | Urbanek .................... | 166/280.2 |
| 2006/0162929 A1 * | 7/2006 | Urbanek .................... | 166/280.2 |
| 2007/0062699 A1 * | 3/2007 | Alary et al. ................. | 166/280.2 |
| 2008/0230223 A1 * | 9/2008 | McCrary et al. ........... | 166/272.2 |
| 2009/0308610 A1 * | 12/2009 | Windebank et al. ....... | 166/280.2 |

FOREIGN PATENT DOCUMENTS

| | | |
|---|---|---|
| CN | 1730422 | 2/2006 |
| GB | 1089213 | 11/1967 |
| WO | WO 9604464 | 2/1996 |
| WO | WO 03042497 | 5/2003 |
| WO | WO 2004085490 | 10/2004 |
| WO | 2006/079208 | 8/2006 |

OTHER PUBLICATIONS

Panfilov M.I., et al., *Pererabotka shlakov I bezotkhodnya tekhnologiya v metallurgii* Moscow, Metallurgiya, 1987, pp. 5, 50, 63, 64, 90, 97.
Porgotovka poverkhnosti pered nanecenim pkrytii VIKOR Polimernye protivokorrozionnye materialy tekhnologii VIKOR (url: http://corrosia.narod.ru/abraz.htm>.
International Search Report for the equivalent PCT patent application No. PCT/RU2007/000502.

* cited by examiner

*Primary Examiner* — George Suchfield
(74) *Attorney, Agent, or Firm* — Jeremy D. Tillman

(57) ABSTRACT

This invention refers to the oil and gas production industry and can be employed to enhance the productivity of wells by preventing the closure of fractures through application of proppant granular material during the formation fracturing operation.

16 Claims, No Drawings

PROPPANT, A METHOD FOR PRODUCTION THEREOF AND FORMATION HYDRAULIC FRACTURING METHOD USING THE PRODUCED PROPPANT

BACKGROUND

The statements in this section merely provide background information related to the present disclosure and may not constitute prior art.

This invention relates to the hydrocarbon production industry and can be implemented for increasing the productivity of wells by preventing fractures from closure through the use of propping granulated material (proppant) during a fracturing operation of a petroleum bearing subterranean formation.

Formation hydrofracturing is considered as one of the most promising technologies in petroleum industry, which allows increasing a well production, provided that this technology is applied properly. The essence of the proposed method lies in injection under a high pressure of a viscous fluid into hydrocarbons-bearing formations to produce fractures in the said formation; the fractures provide the paths for transport of formation fluids. To keep the fractures partially open, mechanically strong spherical grains (proppant) are delivered into the fracture; the proppant is inert to the well fluid. The proppant fills (at least partially) the fracture to develop a strong wedged-out composition, which is permeable for formation fluid. Proppants, being artificially manufactures grains, should not only withstand a high formation pressure that tends to deform proppant particles (thus leading to an inevitable closing of the fracture), but also withstand the impact of aggressive well fluids (moisture, sour gases, saline solutions) at high downhole temperatures. When proppant particles are destroyed under the impact of well fluids, the created fractures tend to close and this may result in reduction of well yield. On a commercial scale, proppants are obtained by processing of feedstock (silica sand, bauxite, kaolin, alumina oxides, various aluminosilicate type of feedstock).

SUMMARY

Some embodiments relate to the hydrocarbon production industry and can be implemented for increasing the productivity of wells by preventing fractures from closure through the use of propping granulated material (proppant) during a fracturing operation of a petroleum bearing subterranean formation.

One embodiment is a proppant including air-cooled, swollen and beaded slag grains, where the proppant has a density of from about 1.5 to about 4.0 $g/cm^3$, and a Mohs scale hardness value of from about 4 or greater.

In another embodiment, disclosed is a method of formation fracturing by placing a proppant in a fracture, the proppant comprising air-cooled, swollen and beaded slag grains, where the proppant has a density of from about 1.5 to about 4.0 $g/cm^3$, and a Mohs scale hardness value of from about 4 or greater.

Another embodiment relates to methods of preparing a proppant, where the proppant includes air-cooled, swollen and beaded slag grains, the proppant has a density of from about 1.5 to about 4.0 $g/cm^3$, a Mohs scale hardness value of from about 4 or greater, and where at least one of the slag grainss is milled, beaded or sintered at temperatures from about 400 to about 1,600° C.

DESCRIPTION OF SOME ILLUSTRATIVE EMBODIMENTS

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Some embodiments of the invention characterize a new proppant that is used in the formation fracturing process with the fracture closure pressure up to 15,000 psi (10 MPa). Proppant is an inorganic sphere-shaped grain of various sizes, which is used for keeping a fracture open after the pumping of fracturing fluid is competed, with the aim to provide the escape passages for liquid hydrocarbons outflowing from the formation. These proppants are manufactured on the basis of different ferrous slags which are formed in the iron, cast iron, and steel metallurgical process, or on the basis of non-ferrous metallurgical and non-metallurgical slags (copper, nickel, phosphorous, lead, zinc-lead, zinc, alumina and titanium slags).

The American Society for Testing and Materials (ASTM) (1999) defines the blast furnace slag as a "non-metal product generally comprising calcium silicates and other bases which are formed during the iron melting process in blast furnaces".

In the iron manufacturing process, iron ore, fluxing additives (typically, limestone or dolomite) and coke (as fuel and reducing agent) are loaded into a blast furnace. Iron ore is a mixture of iron, silica and alumina oxides, which, alongside with the added fluxing agent (alkaline-earth metal carbonates), form the layers of melting slag and iron. Oxygen in the form of hot air stream is injected into the furnace and reacts with coke's carbon to produce the required heat and carbon monoxide. At the same time, iron ore is deoxidized to form iron, mainly, through a reaction of a carbon oxide with an iron monoxide, resulting in the production of carbon dioxide ($CO_2$) and metallic iron. The fluxing additive decomposes into calcium and magnesium oxides and carbon dioxide; calcium and magnesium oxides react with silica and alumina oxides to produce a metallurgical slag. The slag is transported to a cooling well either directly or with iron-made ladders, dependent on a distance between the well and the furnace.

Dependent on the cooling technology applied, three type of slag can be obtained: air-cooled, swollen, and beaded. The air-cooled slag is obtained through a slow cooling of slag in an outdoor well, in open air. In case if the slag solidifies during a slowly-passing cooling process, the escaping gases leave a low-density porous aggregation behind them. The slag, which is solidified in open air during a controlled rapidly-passing cool-down process (the so-called quenching) is generally an endurable and dense slag. The swollen slag is formed in the course of a rapid cool-down of melted slag in water (or in water, with a combined steam & compressed air effect). Steam and other gases increase the porosity and cellular structure of the slag, resulting in formation of light aggregations. Beaded slag is obtained by quenching (rapid cooling) of melted slag through its conversion into a vitreous state by using high pressure water nozzles. Quenching prevents the crystallization of minerals constituting the slag; as a result, vitreous aggregations in the form of grains are produced.

The main components of slags obtained during the iron and steel production process are silica oxide ($SiO_2$), alumina oxide ($Al_2O_3$), calcium oxide (CaO) and magnesium oxide (MgO), the share in the composition of these slags reaches 95%. Manganese and iron oxides, sulfur & metal compositions as well as trace quantities of other substances are considered as minor components of slag composition. Physical properties such as density, porosity, and particle size depend on the slag cool-down rate and its chemical composition.

Nonferrous slags are formed during extraction and processing of other metals from natural ores. These slags are a molten byproduct of high-temperature process which is used primarily for separation of the metal and non-metal components comprised in the ore bulk. The cooled molten slag converts into the material (in the form of crushed stone or grains).

The processing of majority of ores includes a number of standard operations. The ore is first processed to remove gangue (associated rocks and minerals). The processing procedure typically includes rock milling into a fine powder and the follow-up gravitational separation of any kind to separate metallic ores from the rock. For this purpose, different devices are applied: cyclone separators, inclined vibration tables, floatation reservoirs, etc. The processed ore is then subjected to thermal treatment to separate metal from non-metallic components, with a followed-up reduction of free metal. Since the majority of these metals can not be used in pure state, they are then mixed with other elements and compositions to form alloys with desired properties.

During the preparation to a metal reduction process (this process is intended to separate metal from non-metal components), some non-oxide minerals are turned into oxides due to heating in open air at the temperatures below their melting point ("ore roasting"). In this process, metal sulfides presented in copper and nickel ores are converted into oxides. Reduction of metal ions into a free metal typically finalizes in a process called melting. In this process, a reducing agent such as coke (carbon with admixtures), alongside with carbon monoxide and hydrogen, reacts with a roasted product and converts into a silicious flux. After that, using a gravimetrical method, metal is separated from the blend composition and the slag is remained in place.

Table 1 shows typical physical properties of non-ferrous slags. Since lead, lead-zinc and zinc slags have similar properties, they are combined into one group.

TABLE 1

| Properties | Nickel slag | Copper slag | Phosphorous slag | Lead, lead-zinc and zinc slags |
|---|---|---|---|---|
| Appearance | Reddish-brown or brown-black, angularly-shaped with amorphous texture | Black, vitreous, more cellular when beaded | From dark gray to black, flat and elongated when air-cooled; homogeneous and angularly-shaped when beaded | Red of black, vitreous, sharp-shaped (cubic) particles |
| Specific weight, kg/m³ | 3,500 | 2,800-3,800 | air-cooled: 1,360-1,440; swollen: 880-100 | <2,500-3,600 |
| Absorption (%) | 0.37 | 0.13 | 1.0-1.5 | 5.0 |

As far as chemical properties are concerned, lead, lead-zinc and zinc slags are generally ferruginous silicates, whilst phosphorous and nickel slags are primarily available as calciferous-magnesium silicates. A typical composition of these slags is presented in Table 2.

TABLE 2

| Element | Copper slag of reverberatory furnaces | Nickel slag | Phosphorous slag | Lead slags | Lead-zinc slags |
|---|---|---|---|---|---|
| $SiO_2$ | 36.6 | 29.0 | 41.3 | 35.0 | 17.6 |
| $Al_2O_3$ | 8.1 | Traces | 8.8 | — | 6.1 |
| $Fe_2O_3$ | — | 53.06 | — | — | — |
| CaO | 2.0 | 3.96 | 44.1 | 22.2 | 19.5 |
| MgO | — | 1.56 | — | — | 1.3 |
| FeO | 35.3 | — | — | 28.7 | — |
| $K_2O$ | — | — | 1.2 | — | — |
| F | — | — | 2.8 | — | — |
| MnO | — | traces | — | — | 2.0-3.0 |
| $P_2O_5$ | — | — | 1.3 | — | — |
| Cu | 0.37 | — | — | — | — |
| BaO | — | — | — | — | 2.0 |
| $SO_3$ | — | 0.36 | — | — | — |
| Free CaO | — | — | — | — | — |
| S | 0.7 | — | — | 1.1 | 2.8 |
| PbO | — | — | — | — | 0.8 |

Typical physical properties were defined in accordance with the Recommended Practice 60 of the American Petroleum Institute (API).

Bauxite-based proppant and methods of proppant production are described in U.S. Pat. No. 4,713,203, incorporated herein by reference thereto. The known proppant is available in the form of 2-0.3 mm-sized spherical particles and remain uncrushed at the closure pressure up to 20,000 psi. The known proppant comprises natural bauxite, containing a fine fraction of a non-calcinated natural bauxite comprising mainly argillite, boehmite and kaolinite particles, with a kaolinite content of no more than 25% of all the above-mentioned particles. The fine fraction surface area is about 30 m²/gram. The bauxite fraction contains 30-50% of argillite, 22-45% of boehmite, and 16-24% of kaolinite, i.e., the above-mentioned non-calcinated bauxite fraction contains 57-63% of aluminum oxide, or the bauxite fraction contains 7-11% of silicon oxide. Proppant is produced through separation of fine fraction, with a follow-up granulation, drying and caking at temperatures of 1,350-1,500° C. The final product density is lower than 3.4.

Light proppants as well as methods for light proppant production and application are described in U.S. Pat. No. 4,921,820 and WO/9604464, both of which are incorporated herein by reference thereto. The proppant are represented in a form of sintered ceramic grains whose furnace burden mainly contains a mixture of kaolin clay and amorphous or cryptocrystalline silica. Kaolin clay contains a negligible amount of quartz (below 1%) and before being sintered, it should not experience any heat impact in order to prevent a phase transition of the clay into mullite and cristobalite. The specific weight of grains is less than 2.7; the permeability of this proppant is not less than 3,000 millidarcy-foot after 50 hours under pressure of 8,000 psi and at a temperature of 275° F. in the presence of a 2% KCl solution.

Low-density sintered proppants for oil and gas wells are described in U.S. Pat. No. 4,668,645, incorporated herein by reference thereto. The patent describes the composition of a beaded propping agent with Krumbein's number of 0.8 and over, and a particle diameter in the range from 0.2 to 1.77 mm. Grains are manufactured from a natural bauxitic clay of the following composition (in dry state): 16-19% of silicon dioxide, 79-80% of aluminum oxide and less than 0.35% of oxides of alcaline and alkaline-earth metals. Grains are calcinated at a temperature of 1,400-1,500° C.; as a result, a proppant that contains mullite as a base phase and alpha-aluminum oxide as a supplementary phase is formed. The proppant manufacturing process is also described.

The composition of silica proppant is described in U.S. Pat. No. 6,753,299 and WO 03/042497, both of which are incorporated herein by reference thereto. The proppant composition includes equal-by-weight quantities of non-calcinated bauxite, non-calcinated slate stone and quartz with a binder, formed from wollastonite and talc in the amounts of less than 10% of the composition weight. The proppant composition contains less than 25% (by weight) of aluminum oxide and over 45% (by weight) of earth silicon.

The publication WO2004085490 "Titanium dioxide cleaning agent and titanium dioxide cleaning agent production method", incorporated by reference, characterizes a clean-up agent comprising round or sphere-shaped particles of titanium dioxide, and proposes a method to obtain this cleaning agent. The said cleaning agent is effective for removal of titanium dioxide deposits laid on the walls of a reaction vessel made of titanium dioxide. The essence of the proposed method is to form "green" grains from titanium dioxide in a high-capacity blender that mixes commercially available titanium dioxide powder with water. Grains obtained in such a way have round or spherical shapes and the density of 1.38 g/cm³ to 2.46 g/cm³. The API proppant strength testing procedure showed that typically less than 40% of grains are destroyed at a pressure of 4,000 psi. The products are sintered at a temperature of about 550° C. to 1,050° C.

Another proppant is described in U.S. Pat. No. 5,188,175, incorporated herein by reference. In this case, proppant is spherical ceramic grains made of a sintered kaolin clay, which contains alumina, silica, iron and titanium oxides, with the oxides content in these grains as follows (%, weight): aluminum oxide—25-40%; silicon oxide—50-65%, iron oxide—1.6%, and titanium oxide—2.6. Spherical shape factor for grains is 0.7. This proppant is the most effective for treating oil and gas formations at low and medium depths.

The complexity of initial furnace burden as well as difficulties in producing proppant particles are the main disadvantages of the known proppants. This, in turn, increases the proppant production related expenses and thus increases the proppant primary costs.

Proppants from bauxite calcinated at the temperature of 1,000° C., which improves the $Al_2O_3/SiO_2$ ratio and therefore enhances proppant strength performance, are described in U.S. Pat. No. 4,668,645. However in this case the primary cost of proppant grows significantly.

Proppants on the basis of bauxite and kaolin mixture are described in U.S. Pat. No. 4,879,181, incorporated herein by reference thereto. The approach proposed here allows providing plasticity to the initial mass and, therefore, ensure good sphericity and roundness of proppants, however, at an increased primary cost.

Two-layer proppants are described in U.S. Pat. No. 4,944,905, incorporated herein by reference. The inner layer of the said proppant consists of an alumino-silicate matter, which is characterized by a rather lower melting temperature; the outer layer, characterized by a high concentration of alumina oxides, contains aluminum oxide. Nepheline syenites are proposed to be used as a substance with a lower melting point, which is capable of forming (during the cool-down process) a vitreous phase. To produce these proppants, a blend of preliminary roasted nepheline syenite and fine-grained aluminum oxide is granulated with the addition of water and a binder. Following the drying process, these granular material is mixed with a fine-size alumina to prevent adhesion between grains and to prevent adherence to the walls of calcination kiln during the re-roasting. Calcination in the rotating kiln takes place at the melting temperature of nepheline syenite. Once the calcination process is over, the grains are then blown in the air stream to remove the unsintered aluminum oxide. After that, a reiterated calcination is carried out at a higher temperature, with a repeated addition of aluminum oxide. During the re-calcination, a thicker surface layer of aluminum oxide, which should provide the sufficient strength of final proppants, is formed.

A rather complex multi-stage proppant production technology, incorporating two power-consuming processes of grains calcination in a rotating kiln, which significantly increases the cost of the finished proppant, has obvious disadvantage of the known engineering solution.

Another proppant, described in U.S. Pat. No. 3,929,191 and incorporated herein by reference, is used in oil production with the application of the formation fracturing method. Proppant is obtained from sintered aluminosilicate feedstock, or based on minerals, or from iron or steel, in the form of grains with a size of 6-100, preferably, 10-40 mesh, with the Krumbein's sphericity and roundness of not lower than 0.8, density 2.6 g/cm³, with a fusible phenol resin coating.

High cost of the finished product is the obvious disadvantage of the known engineering solution.

According to a preliminary study of science/technology and patent publications, nothing is described about the use of slags as proppants for formation fracturing. The engineering task to be resolved by using the developed engineering solution is aimed to production of proppant particles with high operating performance and low cost. The engineering result, which can be reached though the implementation of the proposed proppant, is aimed to cut the cost of hydrocarbon fluids produced.

To obtain the above-mentioned engineering result, it is proposed to use granulated material of air-cooled, swollen and beaded slags as a proppant. Meanwhile, slag granules used as proppant should meet the following requirements:
density: from 1.5 to 4 g/cm$^3$
Mohs scale hardness: 4 minimum.

One of the below listed slags, at least, can be selected to be used as a proppant: ferrous metallurgy slags (formed during the iron, black iron and steel melting process) and/or non-ferrous metallurgy slags (titanium, aluminum, nickel, copper, lead, zinc, lead-zinc, magnesium, manganese slags), as well as slags formed in the phosphorous production process. The low-density particle size could vary from 1 to 500 µm. During the newly-proposed proppant production, at least one of the above-mentioned slags can be milled, grinded, beaded and sintered at temperatures of 400° C. to 1,600° C. In one embodiment of the proposed proppant production options, at least two different slags are used; these slags can be milled (grinded), either individually or together, mixed (if they were not mixed at the preceding production stages), beaded and sintered at temperatures of 400 to 1,600° C. During the blending, milling and/or beading processes, an organic or non-organic plasticizing agent for beading can be added. The slag powder can additionally be blended with a milled bauxite or aluminum oxide and/or clay powder and than can be treated as described above. Proppant particles can additionally be coated with an organic or non-organic coating with the aim to strengthen grain surfaces and to increase conductivity of a package created with the application of the said slag.

The above-described proppant is employed for formation fracturing (when air-cooled, swollen and beaded slags are used as a proppant) at fracture closure pressures of up to 15,000 psi (100 MPa).

The developed engineering solution was implemented as follows. Slag particles obtained in the copper production process, with an average particle size of 0.6 mm and density 3.2 g/cm$^3$, were used as a propping agent for formation fracturing in Western Siberia at the depth of 3,500 m; the implementation of this technology allowed us to decrease expenses by 40% as compared to an alternative formation fracturing technology, carried out under similar conditions, but with the application of ceramic proppant with a density of 3.2 g/cm$^3$, due to a lower cost of slag particles. Meanwhile, the daily yield of the well was 160 m$^3$ for both cases.

Another embodiment of the newly-proposed invention implementation can be described based on the following example. Particles of swollen nickel and phosphoric slags were milled with a residue at a 63 µm sieve (3% by weight), using a dry method; then, milled particles were blended at a 3:2 ratio (by weight), and thereafter a bauxite ore powder milled to pass through a 40 µm sieve (0.5% by weight) was added. The slag mixture-to-bauxite ratio is 7:3 by weight. Then, about 4 kg of the obtained mixture were placed in the Eirich R02 granulation machine. The blending process was started at a blade mixer's speed at which the nucleation in the mixture took place; during this process, 600 g of a 3% carboxymethyl cellulose water solution were added to the material. Mixing at a specified speed continued for 4 minutes. After that, the rotational speed was changed, and 200 g of the initial mixture of milled silicone carbide and heat-treated bauxite ore were introduced into the graining machine. The period of time required for additional mixing at a grain-formation speed, at which granules of the desired size (0.15-5.0 mm) are formed, was 2 minutes. Grains prepared in this manner were dehydrated and dispersed to produce more than 90% between the sieves −16 mesh/+30 mesh. Calcination was conducted at a temperature of 1,300-1,500° C. After the calcination process was complete, the apparent specific gravity of the material was 3.52 g/cm$^3$. The best strength performance data were observed at a temperature of 1,450° C.; meanwhile, the destruction percentage at a pressure of 10,000 psi (69 MPa), defined in compliance with the API Recommended Practice 60, was 3% (by weight).

The cost of the proppant produced by the described method did not exceed 80% of the cost of proppant produced by using traditional methods.

We claim:

1. A proppant comprising air-cooled, swollen and beaded slag grains, wherein the proppant has a density of from about 1.5 to about 4.0 g/cm$^3$, and a Mohs scale hardness value of from about 4 or greater, wherein at least one of the slag grains is milled, beaded and/or sintered at temperatures from about 400 to about 1,600° C., and wherein the at least one of the slag grains is additionally mixed with a milled material comprising at least one of bauxite, aluminum oxide, and clay powders.

2. The proppant of claim 1 comprising at least one commercially produced slag.

3. The proppant of claim 1, wherein a size of low-density particle of the proppant is from about 0.1 to about 3 mm.

4. The proppant of claim 1, wherein at least two different slag grains are used.

5. The proppant of claim 4, wherein the slag grains are individually milled and then mixed.

6. The proppant of claim 5, wherein a plasticizing agent for beading is added during the mixing, milling and/or beading processes.

7. The proppant of claim 6, wherein the plasticizing agent comprises organic materials, non-organic materials, or combination thereof.

8. The proppant of claim 4, wherein the slag grains are mixed before being milled.

9. The proppant of claim 1, wherein an organic or non-organic coating is additionally applied on proppant particles.

10. A method of formation fracturing comprising placing a proppant in a fracture, the proppant comprising air-cooled, swollen and beaded slag grains, wherein the proppant has a density of from about 1.5 to about 4.0 g/cm$^3$, and a Mohs scale hardness value of from about 4 or greater, wherein at least one of the slag grains is milled, beaded and/or sintered at temperatures from about 400 to about 1,600° C., and wherein the at least one of the slag grains is additionally mixed with a milled material comprising a least one of bauxite, aluminum oxide, and clay powders.

11. The method of claim 10 wherein the proppant withstands fracture closure pressures up to about 10 MPa.

12. The method of claim 10 wherein the proppant comprises low-density particles with a size from about 0.1 to about 3 mm.

13. The method of claim 10, wherein at least two different slag grains are used.

14. The method of claim 13, wherein the slag grains are individually milled and then mixed.

15. The method of claim 13, wherein the slag grains are mixed before being milled.

16. A method of preparing a proppant, the method comprising: forming a proppant comprised of air-cooled, swollen and beaded slag grains, wherein the proppant has a density of from about 1.5 to about 4.0 g/cm$^3$, and a Mohs scale hardness value of from about 4 or greater, wherein at least one of the slag grains is milled, beaded or sintered at temperatures from about 400 to about 1,600° C., and wherein the at least one of the slag grains is additionally mixed with a milled material comprising at least one of bauxite, aluminum oxide, and clay powders.

* * * * *